United States Patent
Sretenovic (10) Patent No.: US 7,181,508 B1
(45) Date of Patent: Feb. 20, 2007

(54) SYSTEM AND METHOD FOR COMMUNICATING, MONITORING AND CONFIGURING A DEVICE OPERATIVELY CONNECTED TO A NETWORK

(75) Inventor: Dragan Sretenovic, Maple Shade, NJ (US)

(73) Assignee: Oki Data Americas, Inc., Mount Laurel, NJ (US)

( * ) Notice: Subject to any disclaimer, the term of this patent is extended or adjusted under 35 U.S.C. 154(b) by 617 days.

(21) Appl. No.: 09/709,916

(22) Filed: Nov. 9, 2000

(51) Int. Cl.
*G06F 15/177* (2006.01)

(52) U.S. Cl. ...................... 709/220; 340/506

(58) Field of Classification Search ............. 706/48, 706/45, 46; 709/220, 221–224, 236, 203, 709/230, 226, 202, 219, 238, 200, 205; 358/1.15; 370/469; 704/2, 10; 707/3, 4, 10, 104, 5; 705/15, 5; 715/513, 854, 523; 718/101; 717/1, 11, 173; 340/825, 506; 713/1, 200; 710/104

See application file for complete search history.

(56) References Cited

U.S. PATENT DOCUMENTS

| | | | | |
|---|---|---|---|---|
| 4,974,191 A | * | 11/1990 | Amirghodsi et al. ........... 704/8 |
| 5,003,472 A | * | 3/1991 | Perrill et al. .................. 705/15 |
| 5,109,484 A | | 4/1992 | Hughes et al. |
| 5,181,163 A | * | 1/1993 | Nakajima et al. ............. 704/10 |
| 5,491,796 A | * | 2/1996 | Wanderer et al. ........... 709/224 |
| 5,701,497 A | * | 12/1997 | Yamauchi et al. ............. 704/3 |
| 5,726,979 A | | 3/1998 | Henderson et al. |
| 5,768,119 A | * | 6/1998 | Havekost et al. .............. 700/4 |
| 5,822,520 A | * | 10/1998 | Parker ........................ 709/230 |
| 5,826,077 A | * | 10/1998 | Blakeley et al. ................ 707/4 |
| 5,903,568 A | * | 5/1999 | Tanaka et al. ............... 370/469 |
| 5,905,779 A | | 5/1999 | Steinmetz |
| 5,913,037 A | * | 6/1999 | Spofford et al. ............. 709/226 |
| 5,935,209 A | * | 8/1999 | Budhraja et al. ........... 209/223 |
| 5,955,946 A | * | 9/1999 | Beheshti et al. ............ 340/506 |
| 5,960,176 A | * | 9/1999 | Kuroki et al. ............... 709/223 |
| 6,003,078 A | * | 12/1999 | Kodimer et al. ............ 709/224 |
| 6,008,805 A | * | 12/1999 | Land et al. .................. 345/744 |
| 6,009,274 A | * | 12/1999 | Fletcher et al. ............. 717/173 |
| 6,092,099 A | * | 7/2000 | Irie et al. .................... 709/202 |
| 6,094,649 A | * | 7/2000 | Bowen et al. .................. 707/3 |

(Continued)

OTHER PUBLICATIONS

A Java-based SNMP agent for dynamic MIBs; John, A.; Vanderveen, K.; Sugla, B.; Global Telecommunications Conference 1999. GLOBECOM '99, vol. 1A, 1999.*

(Continued)

*Primary Examiner*—Thong Vu
(74) *Attorney, Agent, or Firm*—Akin Gump Strauss Hauer & Feld, LLP (57) ABSTRACT

A method of monitoring a network is employed for communicating with a device operatively connected to the network. The network employs a data engine for interfacing with a data agent connected to the device. The method comprises detecting the presence of the device through the data agent interfacing the data engine and communicating with a first external repository, the first repository for storing device information about the device. Information corresponding to the device is selected from the information stored at the repository and the selected information is transferred from the first repository to the data engine for use in communicating with the device and to dynamically upgrade the network as devices are operatively linked to the network.

17 Claims, 14 Drawing Sheets

U.S. PATENT DOCUMENTS

| | | | | |
|---|---|---|---|---|
| 6,161,103 | A * | 12/2000 | Rauer et al. | 707/4 |
| 6,219,708 | B1 * | 4/2001 | Martenson | 709/226 |
| 6,233,611 | B1 * | 5/2001 | Ludtke et al. | 709/223 |
| 6,237,033 | B1 * | 5/2001 | Doeberl et al. | 709/223 |
| 6,253,240 | B1 * | 6/2001 | Axberg et al. | 709/223 |
| 6,256,668 | B1 * | 7/2001 | Slivka et al. | 709/220 |
| 6,282,508 | B1 * | 8/2001 | Kimura et al. | 704/10 |
| 6,321,262 | B1 * | 11/2001 | Springer | 709/223 |
| 6,321,372 | B1 * | 11/2001 | Poirier et al. | 717/122 |
| 6,336,124 | B1 * | 1/2002 | Alam et al. | 715/523 |
| 6,345,245 | B1 * | 2/2002 | Sugiyama et al. | 707/10 |
| 6,373,841 | B1 * | 4/2002 | Goh et al. | 370/389 |
| 6,385,615 | B1 * | 5/2002 | Haeri et al. | 707/10 |
| 6,389,464 | B1 * | 5/2002 | Krishnamurthy et al. | 709/220 |
| 6,393,389 | B1 * | 5/2002 | Chanod et al. | 704/7 |
| 6,418,448 | B1 * | 7/2002 | Sarkar | 707/104.1 |
| 6,418,467 | B1 * | 7/2002 | Schweitzer et al. | 709/223 |
| 6,421,730 | B1 * | 7/2002 | Narad et al. | 709/236 |
| 6,466,971 | B1 * | 10/2002 | Humpleman et al. | 709/220 |
| 6,466,974 | B1 * | 10/2002 | Nelson et al. | 709/223 |
| 6,532,446 | B1 * | 3/2003 | King | 704/270.1 |
| 6,535,855 | B1 * | 3/2003 | Cahill et al. | 705/1 |
| 6,539,378 | B2 * | 3/2003 | Gupta et al. | 707/5 |
| 6,557,026 | B1 * | 4/2003 | Stephens, Jr. | 709/203 |
| 6,564,243 | B1 * | 5/2003 | Yedidia et al. | 709/203 |
| 6,573,907 | B1 * | 6/2003 | Madrane | 715/719 |
| 6,628,314 | B1 * | 9/2003 | Hoyle | 715/854 |
| 6,628,965 | B1 * | 9/2003 | LaRosa et al. | 455/557 |
| 6,652,169 | B2 * | 11/2003 | Parry | 400/74 |
| 6,678,674 | B1 * | 1/2004 | Saeki | 707/3 |
| 6,704,874 | B1 * | 3/2004 | Porras et al. | 726/22 |
| 6,707,581 | B1 * | 3/2004 | Browning | 358/473 |
| 6,718,332 | B1 * | 4/2004 | Sitaraman et al. | 707/102 |
| 6,742,015 | B1 * | 5/2004 | Bowman-Amuah | 718/101 |
| 6,763,499 | B1 * | 7/2004 | Friedman et al. | 715/513 |
| 6,772,216 | B1 * | 8/2004 | Ankireddipally et al. | 709/230 |
| 6,782,420 | B1 * | 8/2004 | Barrett et al. | 709/223 |
| 6,785,015 | B1 * | 8/2004 | Smith et al. | 358/1.15 |
| 6,795,854 | B1 * | 9/2004 | Parker et al. | 709/223 |
| 6,874,018 | B2 * | 3/2005 | Wu | 709/219 |
| 6,886,044 | B1 * | 4/2005 | Miles et al. | 709/238 |
| 7,058,626 | B1 * | 6/2006 | Pan et al. | 707/4 |
| 2002/0077805 | A1 * | 6/2002 | Hecht et al. | 704/2 |
| 2003/0120760 | A1 * | 6/2003 | Fortin et al. | 709/221 |
| 2004/0015714 | A1 * | 1/2004 | Abraham et al. | 713/200 |
| 2005/0044148 | A1 * | 2/2005 | Son et al. | 709/205 |
| 2006/0136545 | A1 * | 6/2006 | Reistad et al. | 709/200 |

OTHER PUBLICATIONS jpmf.home.cern.ch/jpmf/talks/im_19990525.pdf.*

The Software Dock: A Distributed, Agent-based..—Hall, Heimbigner, .. (1997) . ftp.cs.colorado.edu/users/andre/papers/CU-CS-832-97.ps.*

Network Process Descriptions; html; www.zocalo.net/tng/book/Chap7.html.*

Accounting Attributes and Record Formats; Nevil Brownlee et al; quimby.gnus.org/internet-drafts/draft-ietf-aaa-accounting-attributes-01.txt.*

Integration of SNMP into a CORBA- and Web-based..—Aschemann, Mohr, Ruppert (1999) www.isa.informatik.tu-darmstadt.de/VS/Publikationen/papers/kivs99-cosnmpgw.ps.gz.*

Language service system; DERWENT ACCount-NO:1997-151262.*

Using Reinforcement Learning to Spider the Web Efficiently—Rennie, McCallum (1999) www.cs.cmu.edu/~mccallum/papers/rlspider-icml99s.ps.gz.*

Practical Application of Model Checking in Software..—Havelund, Skakkebaek (1999) ic-www.arc.nasa.gov/ic/projects/amphion/people/havelund/Publications/jpf-fm99.ps.Z.*

Catching the Boat with Strudel: Experiences with a ..—Fernandez.. (1998) www.research.att.com/~mff/strudel/doc/files/sigmod98.ps.gz.*

Java- and CORBA-based network management Leppinen, M.; Pulkkinen, P.; Rautialinen, A.; Computer vol. 30, Issue 6, Jun. 1997 pp. 83-87.*

A Java-based wireless network management system Ming-Yi Lee, Jiann-Liang Chen; Shinfeng Lin; Personal Wireless Communications, 1997 IEEE International Conference on Dec. 17-19, 1997 pp. 353-356.*

Developing integrated management applications Follis, B.; Network Operations and Management Symposium, 1998. NOMS 98., IEEE vol. 2, Feb. 15-20, 1998 pp. 570-578 vol. 2.*

Java-based network management environment Joong-Ki Park; Nan-Joo Ban; Tae-Geun Kim; Communications, 1998. ICC 98. Conference Record.1998 IEEE International Conference on vol. 2, Jun. 7-11 1998 pp. 1124-1128 vol. 2.*

Internet Document Entitled, "*Unicenter TNG Framework Version 2.1 Technical Overview*", Computer Associates pp. 1-6 (1999).

Internet Document Entitled, "*Using Internet Technology to Integrate Management Tools and Information*", James Herman and Theo Forbath, Northeast Consulting Resources, Inc. (Sep. 1998).

Internet Document Entitled, "*HP First To Deliver Device-management Application Using WBEM*", News Release, Palto Alto, California (Jan. 12, 1999).

* cited by examiner

Fig. 1

EXAMPLE OF XML FORMATTED DATA FROM DATA DICTIONARY OR DATA CENTRAL:

```
<?xml version="1.0"?>
<VARIABLES>
  <VARIABLE KEY="15">
    <NAME LANGUAGE="SNMP" VALUE="1.3.6.1.4.1.2001.1.1.1.1.1.40"/>
    <NAME LANGUAGE="PJL" VALUE="OKIPAPERFEED"/>
    <NAME LANGUAGE="English" VALUE="Paper tray source"/>
    <NAME LANGUAGE="French" VALUE="Source de magasin"/>
  </VARIABLE>
</VARIABLES>
```

EXAMPLE OF XML FORMATTED DATA FROM DATA AGENT:

```
<?xml version="1.0"?>
<VARIABLES LANGUAGE="PJL">
  <VARIABLE NAME="DISPLAY" VALUE="ON LINE"/>
  <VARIABLE NAME="PERSONALITY" VALUE="AUTO"
            OPTIONS="ENUMERATED">
    <OPTION VALUE="PCL"/>
    <OPTION VALUE="IBMPPR"/>
    <OPTION VALUE="EPSONFX"/>
    <OPTION VALUE="AUTO"/>
  </VARIABLE>
  <VARIABLE NAME="OKIPAPERFEED" VALUE="TRAY1">
    <OPTION VALUE="TRAY1"/>
    <OPTION VALUE="FRONTTRAY"/>
  </VARIABLE>
  <VARIABLE NAME="OKIAUTOTRAYSWITCH" VALUE="OFF">
    <OPTION VALUE="OFF"/>
    <OPTION VALUE="ON"/>
  </VARIABLE>
</VARIABLES>
```

SYSTEM AND METHOD FOR COMMUNICATING, MONITORING AND CONFIGURING A DEVICE OPERATIVELY CONNECTED TO A NETWORK

BACKGROUND OF THE INVENTION

The present invention comprises a system, as well as a method for monitoring a network and for configuring a device, such as a printer, which is operatively linked to the network or a computer. The system is also for establishing communication between the network and the device in a format understandable by a human operator of the network. The present system and method is capable of communicating with virtually any type of operatively linked device utilizing any available device configured protocol and can generate a user interface in any supported human understandable language. The system can also automatically update itself with respect to newly developed devices or changes to device protocols by downloading any needed data from a central location using an existing communication network, such as the Internet.

Devices, such as printers are typically described by various configuration variables using a variety of different system protocols and languages including SNMP, PJL, HTTP, etc. machine languages which are not easily understood by humans. However, in each language there is a code or series of codes or characters which describe or identify a commonly performed task, instruction or characteristic. For example, all printers have a characteristic which in English is "Paper Tray Source". The same characteristic in a PJL variable would be "OKIPAPERFEED" and in a SNMP variable would be "1.3.6.1.4.1.2001.1.1.1.1.40". The present invention communicates with connected devices utilizing the system protocol or language of the device and "translates" information/data from the connected device into a selected human understandable format for presentation to a human operator.

The present invention reduces development and maintenance time and cost by building generic applications that are modular, data driven and utilize dynamic graphical user interface (GUI) generation instead of integral programs with hard-coded mapping of data to GUI. Using this approach the same software program can operate with any type of device and can present a user interface in any human understandable language. If a device of a previously unknown type is discovered by a system or network, the system or network can dynamically and automatically update itself to permit communication with the newly discovered device or to generate a user interface in a new language. Many network management applications have "knowledge" about device variables coded into the management program. With the present invention description of devices are stored externally so that a generic program can be used making different network protocols, system and human languages and device types and can obtain needed device configurations and variables from the external source as needed.

BRIEF SUMMARY OF THE INVENTION

Briefly stated, the present invention comprises a method of monitoring a network for communicating with a device operably connected to the network. The network employs a data engine for interfacing with a data agent connected to the device. The method comprises detecting the presence of the device through the data agent interfacing the data engine; communicating with a first external repository, the repository for storing device information about the device; selecting information corresponding to the device from information stored at the first repository; and transferring the selected information from the first repository to the data engine for use in communicating with the device, whereby the network is dynamically upgraded as devices are operatively linked thereto.

BRIEF DESCRIPTION OF THE SEVERAL VIEW OF THE DRAWING

The foregoing summary, as well as the following detailed description of preferred embodiments of the invention will be better understood when read in conjunction with the appended drawings. For the purpose of illustrating the invention, there are shown in the drawings, embodiments which are presently preferred. It should be understood, however, that the present invention is not limited to the precise arrangements and instrumentality shown. In the drawings.

DETAILED DESCRIPTION OF THE INVENTION

The system 10 in the present embodiment is specifically directed to peripheral devices, particularly printers, which are connected or otherwise operatively linked to a network or computer. It should be understood that the present invention is equally applicable with respect to devices other than printers, which may be connected or otherwise operatively linked to a network or computer. The system 10 operates under the assumption that every device may be "described" by a set of property variables that are NAME-VALUE pairs. To find out a device configuration, the system can "GET" variable and to change a device configuration, the system can "SET" the values of the device variables.

Figure 1:
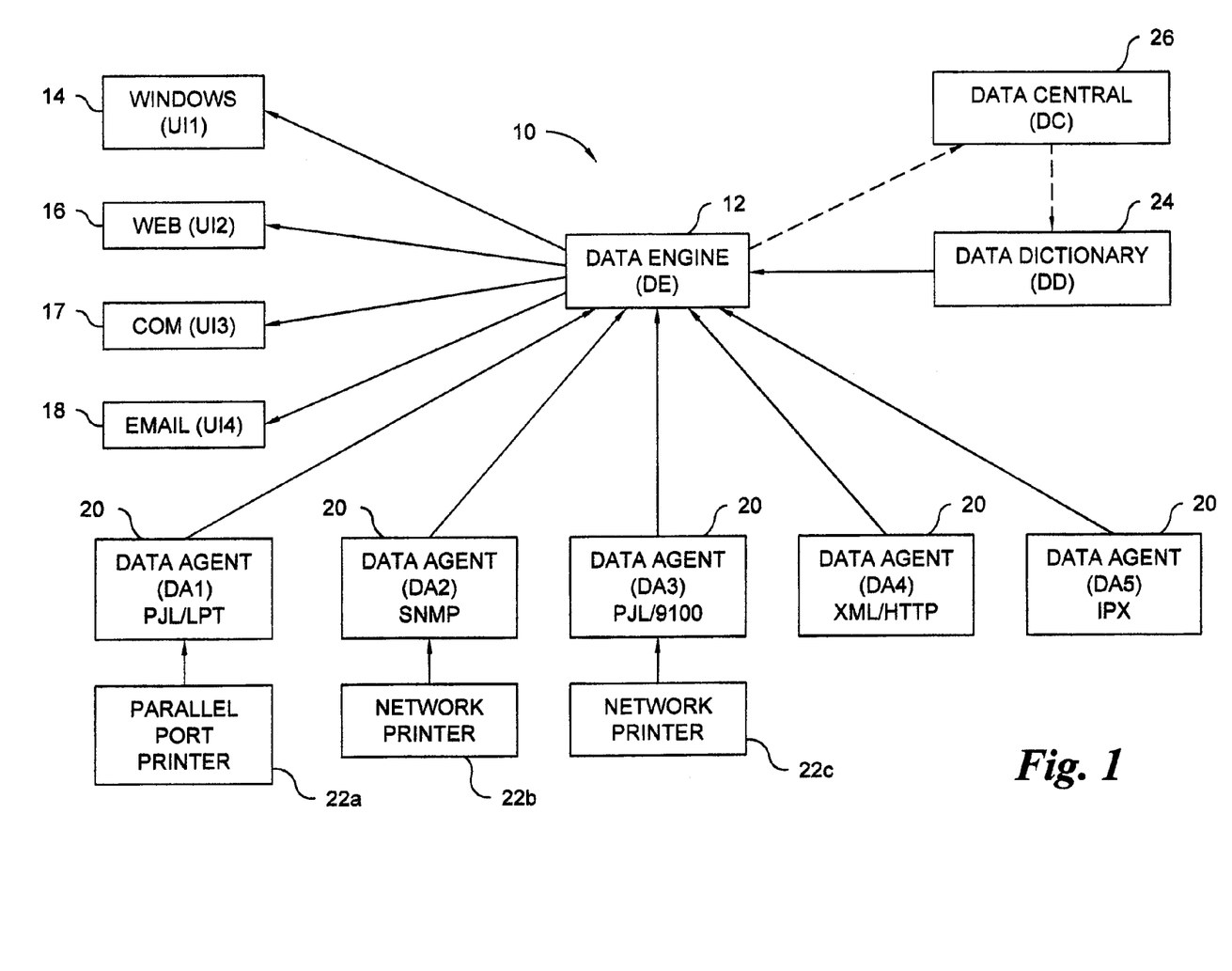
FIG. 1 is a functional schematic block diagram of a first embodiment of a system 10 in accordance with the present invention.

As illustrated in FIG. 1, the system 10 includes a network manager or data engine 12 which is employed for controlling the processing of the various functions of the system 10. In the present embodiment, the data engine 12 is a software module which receives data and/or variables in a predetermined system language from other network components (hereinafter described) and translates or dynamically assembles the received data/variables into a selected, human understandable presentation language or format, such as, GUI, HTML, etc. The data engine 12 thereafter utilizes one or more user interface software modules to dynamically generate a user interface for the data/variables to facilitate user access to the system. Examples of such user interface software modules include an operating system such as Windows 14, a web browser 16 such as Internet Explorer and an E-mail server 18 and a COM interface 17. Other such user interface software modules will be apparent to those of ordinary skill in the art. Each user interface, module communicates with the data engine 12 using a specific address. The user interface modules communicate with a user by dynamically generating screens, web pages, e-mail, etc.

The system 10 also includes a plurality of network agents or data agents 20 which are operatively connected to the data engine 12 to collect and to present data. Each data agent 20 is a software module that communicates with a device, in the present embodiment, printers 22a, 22b, 22c, which are operatively connected to the network. As previously mentioned, any other suitable type of device could alternatively be operatively connected to a data agent 20, if desired. Each data agent 20 "discovers" and communicates with a connected device, such as one of the printers 22a, 22b, 22c, using the specific system protocol and/or language (such as SNMP, PJL, etc.) which is used by the particular device. For example, in connection with the present embodiment, a first data agent 20 communicates with a parallel port printer 22a, utilizing a first standard printer language such as, PJL another data agent 20 communicates with a first network printer 22b utilizing a second standard printer language such as SNMP, etc. The data engine 12 selects a particular data agent 20 that is associated with a selected device. By communicating with the attached device in the system protocol or language used by the device a data agent 20 can obtain from the device information concerning the identity of the device, as well as the language of the attached device and necessary configuration variables. The data agent 20 provides data in the form of NAME=VALUE arrays as well as additional flags like READ ONLY and a listing of allowed values from the device. The obtained data concerning the device is presented by the data agent 20 to the data engine 12. The communication between the data agent 20 and the connected device is preferably bi-directional to facilitate changing the value of configuration variables of the device as selected by a user or as needed.

The system 10 further includes a data dictionary 24 in the form of a local description cache, preferably in XML format. The data dictionary 24 stores information to facilitate translations between the various system protocol or languages used within the devices 22a, 22b, 22c and provides such translation information to the data engine 12 to assist and facilitate the data engine 12 in translating data from the various devices into the selected human understandable form. The data engine 12 thus uses the data dictionary 24 to obtain variable names in the language of a selected data agent 20. For some devices which communicate with the system 10, the data dictionary 24 initially contains in its memory sufficient information to facilitate the translation of the data by the data engine 12. In the case of a new or unknown device connected to the network or an updated device detected by a data agent 20, for which no data or insufficient date is stored within the data dictionary 24, it may be necessary to dynamically update the data dictionary 24 with the requisite information. The data dictionary 24 may be dynamically updated by accessing a central repository of information or data.

The central data repository, referred to in the present embodiment as data central 26 is preferably at a centralized location and is accessible by a variety of communications systems or networks. If necessary, the data central 26 may obtain data which it does not already have from a second repository or source, such as from a vendor's website or the like. In the present embodiment, the data central 26 is accessible by way of the Internet. As shown in FIG. 1, the data central 26 may be accessed directly by the data dictionary 24. Alternatively, a request for the required information may be sent directly to the data central 26 from the data engine 12 and, may either be downloaded directly to the data dictionary 24 or may be supplied to the data dictionary 24 through the data engine 12. The data central is contacted to obtain required information which is not available to the data engine 12 through the data agents 20 or the data dictionary 24. Preferably, data or information is downloaded from the data central 26 in XML format utilizing the HTTP protocol. Once the required translation data concerning the device has been stored in the data dictionary 24, the data engine 12 may access the data, as required for performing its translation functions with respect to the device.

Figure 2:
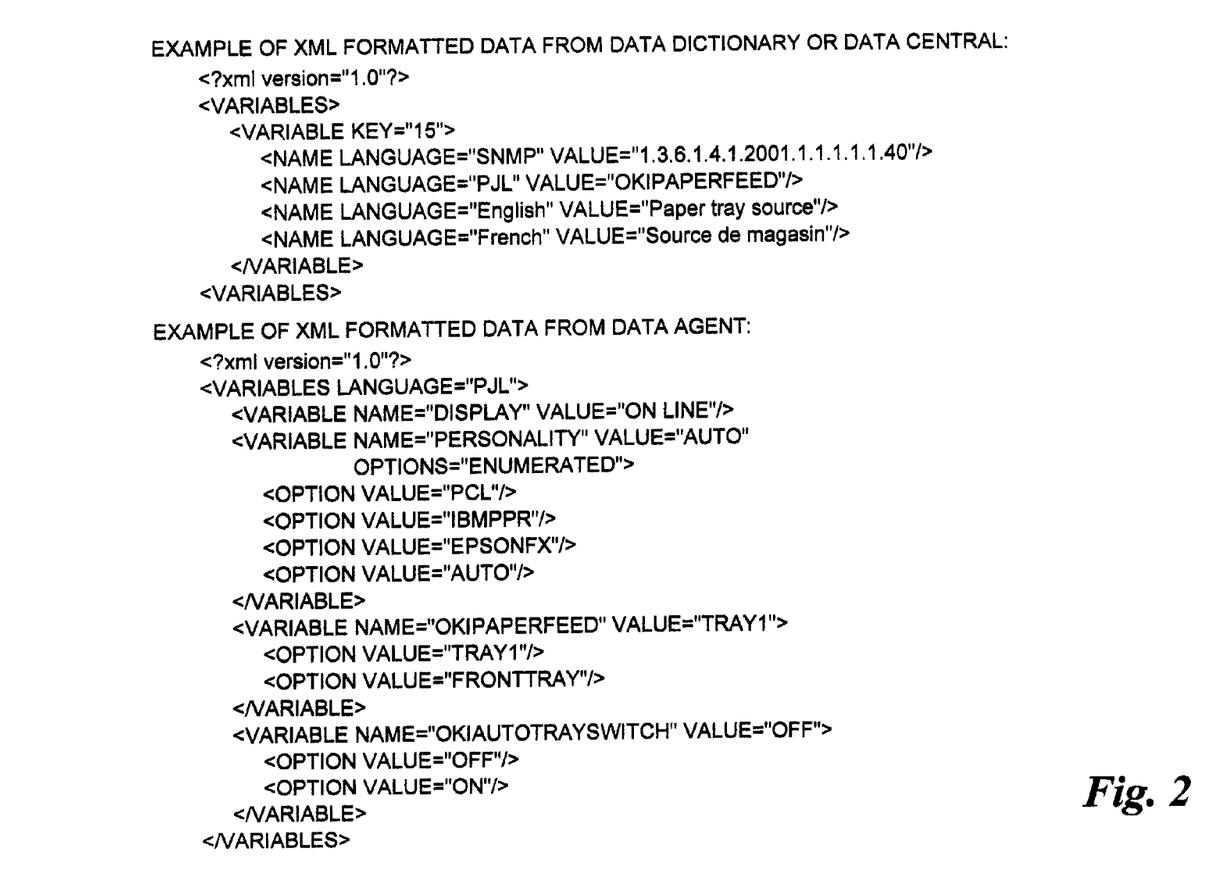
FIG. 2 illustrates examples of portions of the software function of the system of FIG. 1.
Figure 3A:
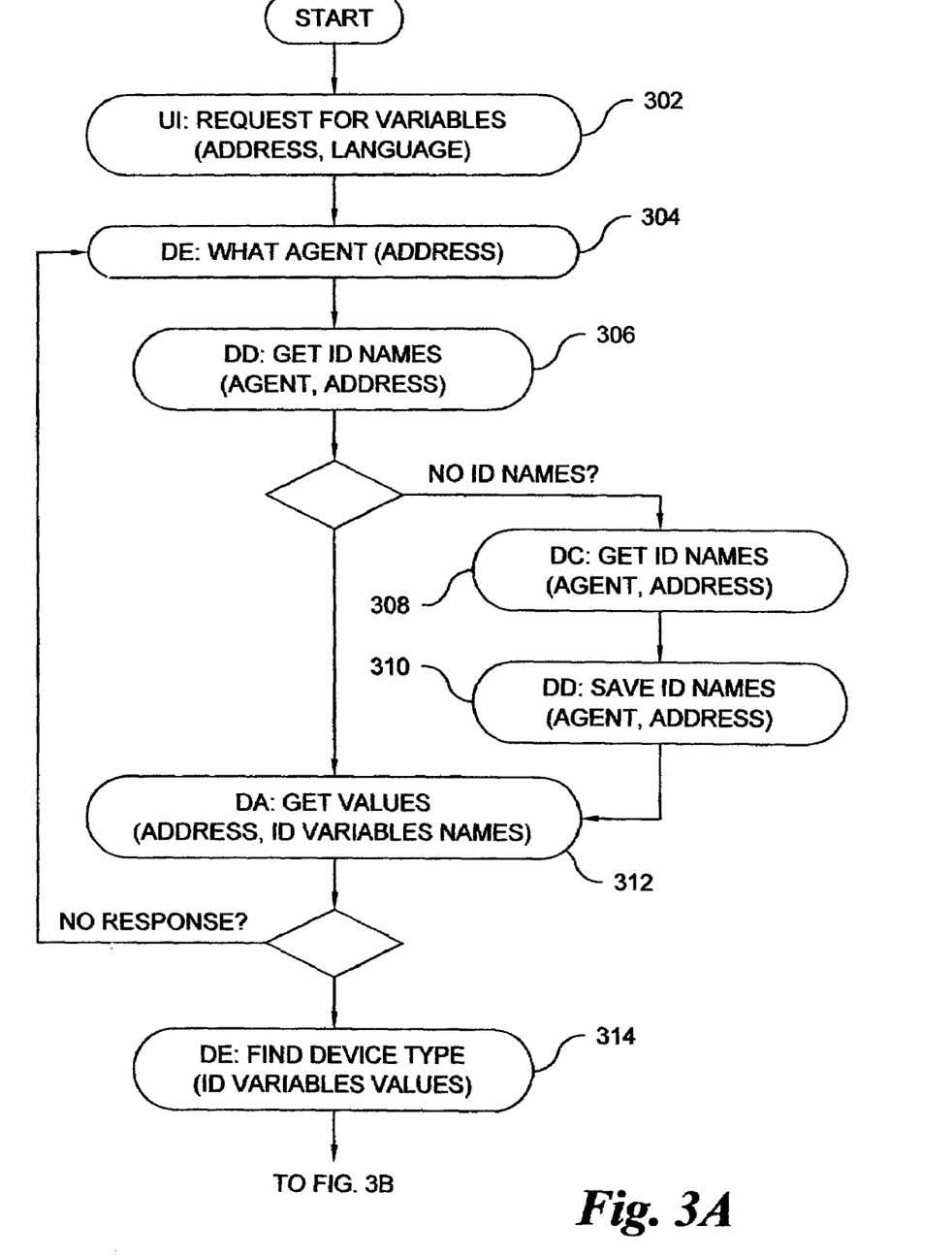
FIGS. 3A–3B is a software flow diagrams illustrating the process of getting translated names and values of all variables.
Figure 3B:
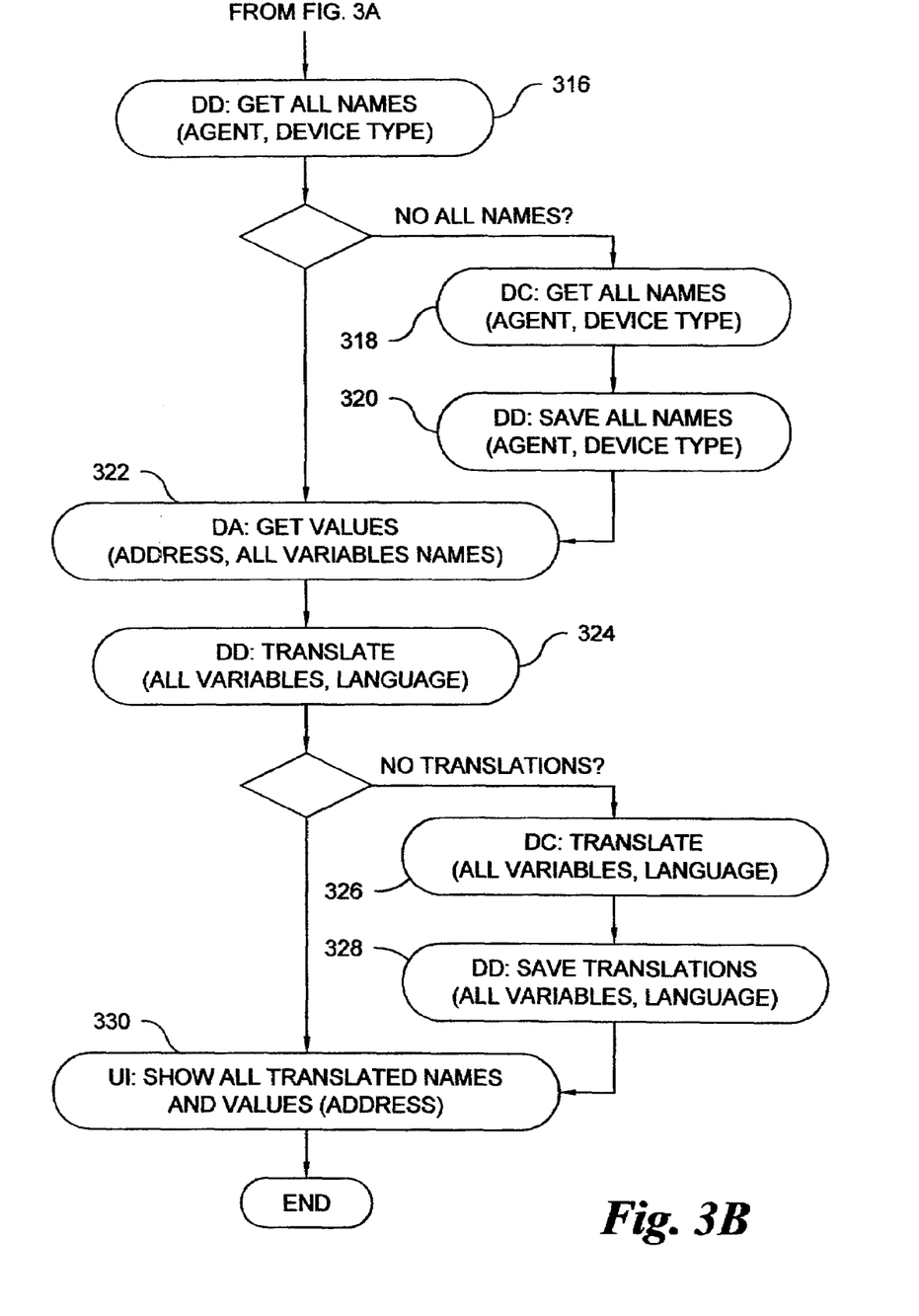
Figure 4A:
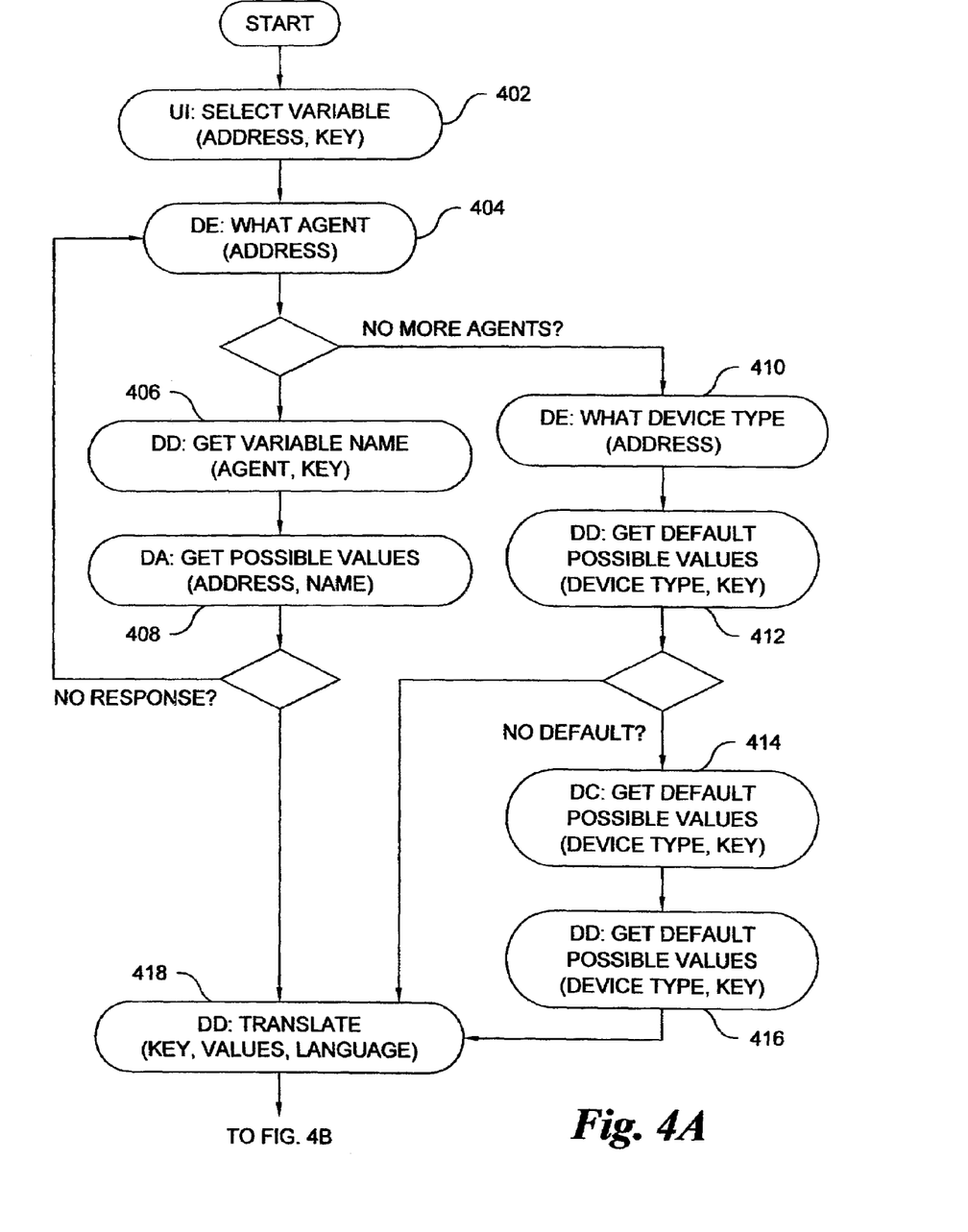
FIGS. 4A–4B is a software flow diagram illustrating the process of changing the value of a variable.
Figure 4B:
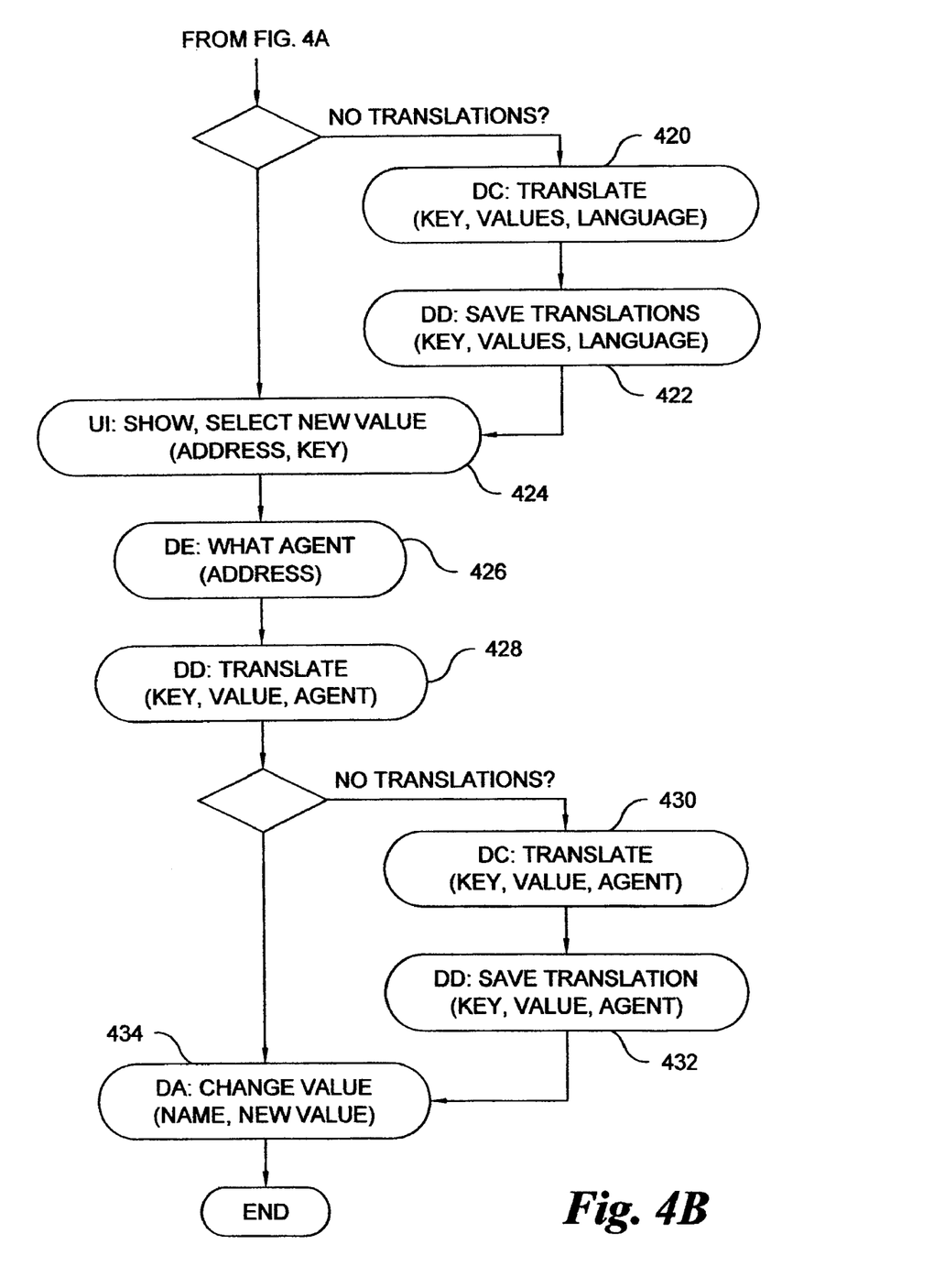
Figure 5A:
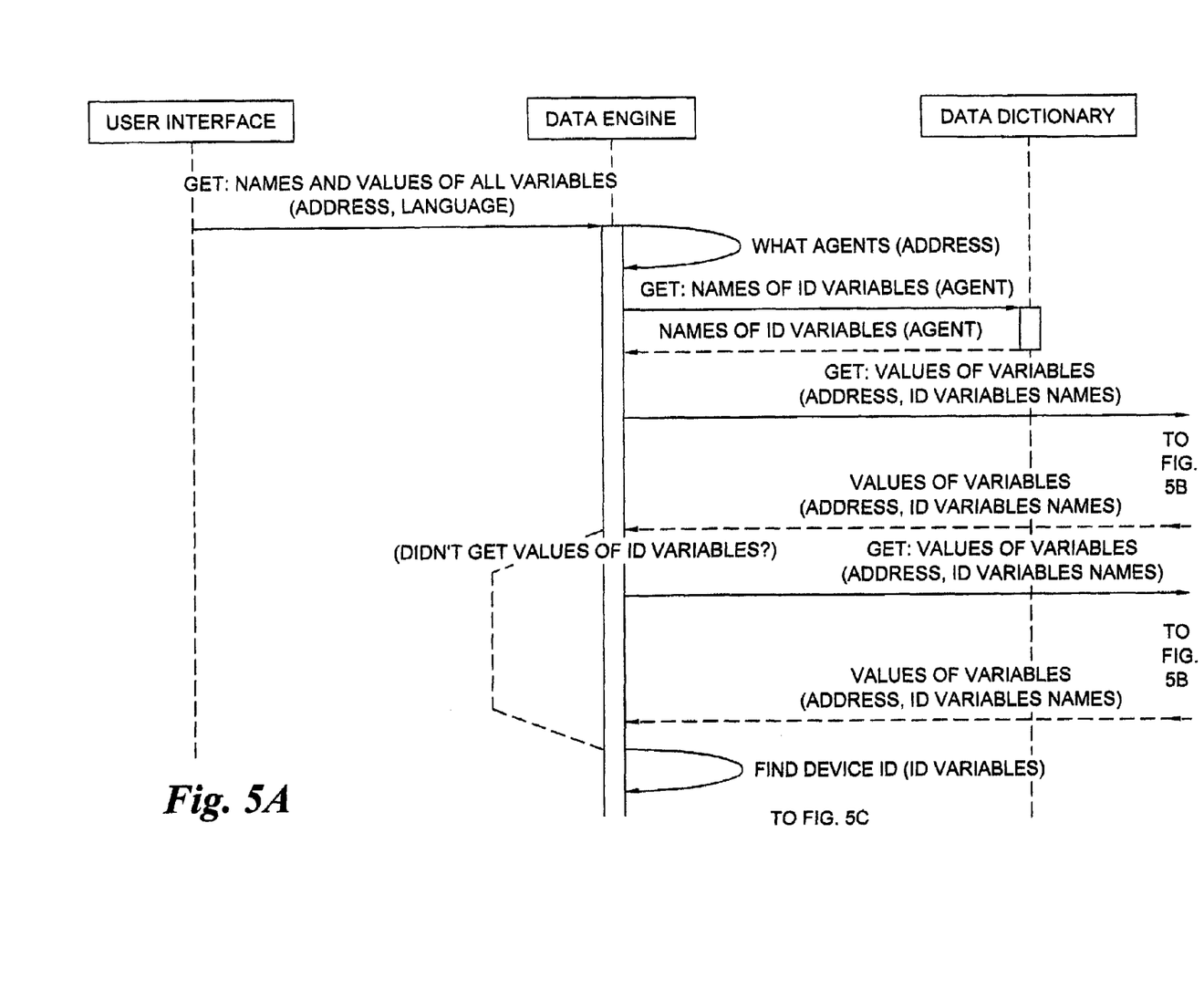
FIGS. 5A–5D is a software sequence diagram corresponding to the flow diagram of FIGS. 3A–3B.
Figure 5B:
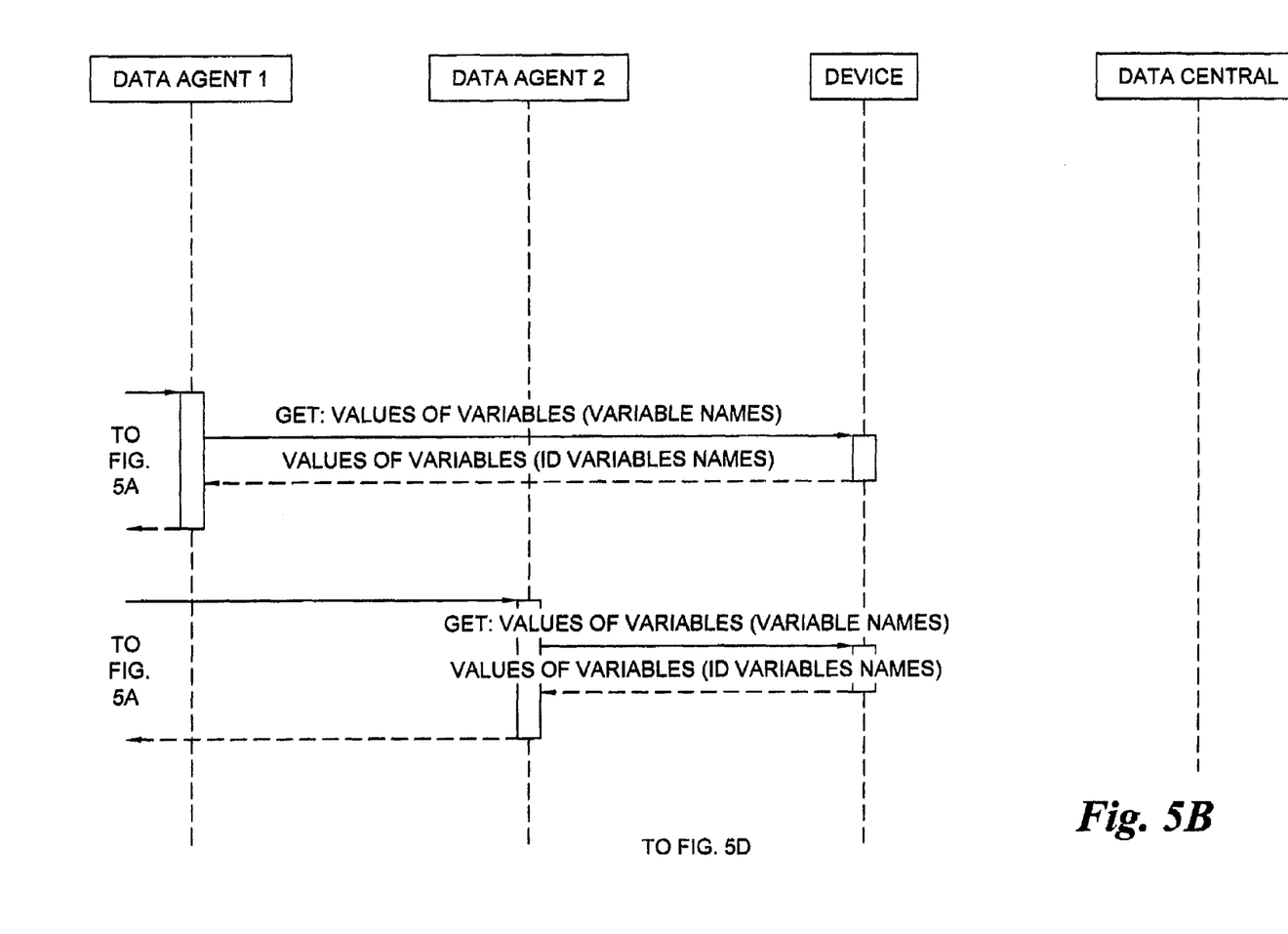
Figure 5C:
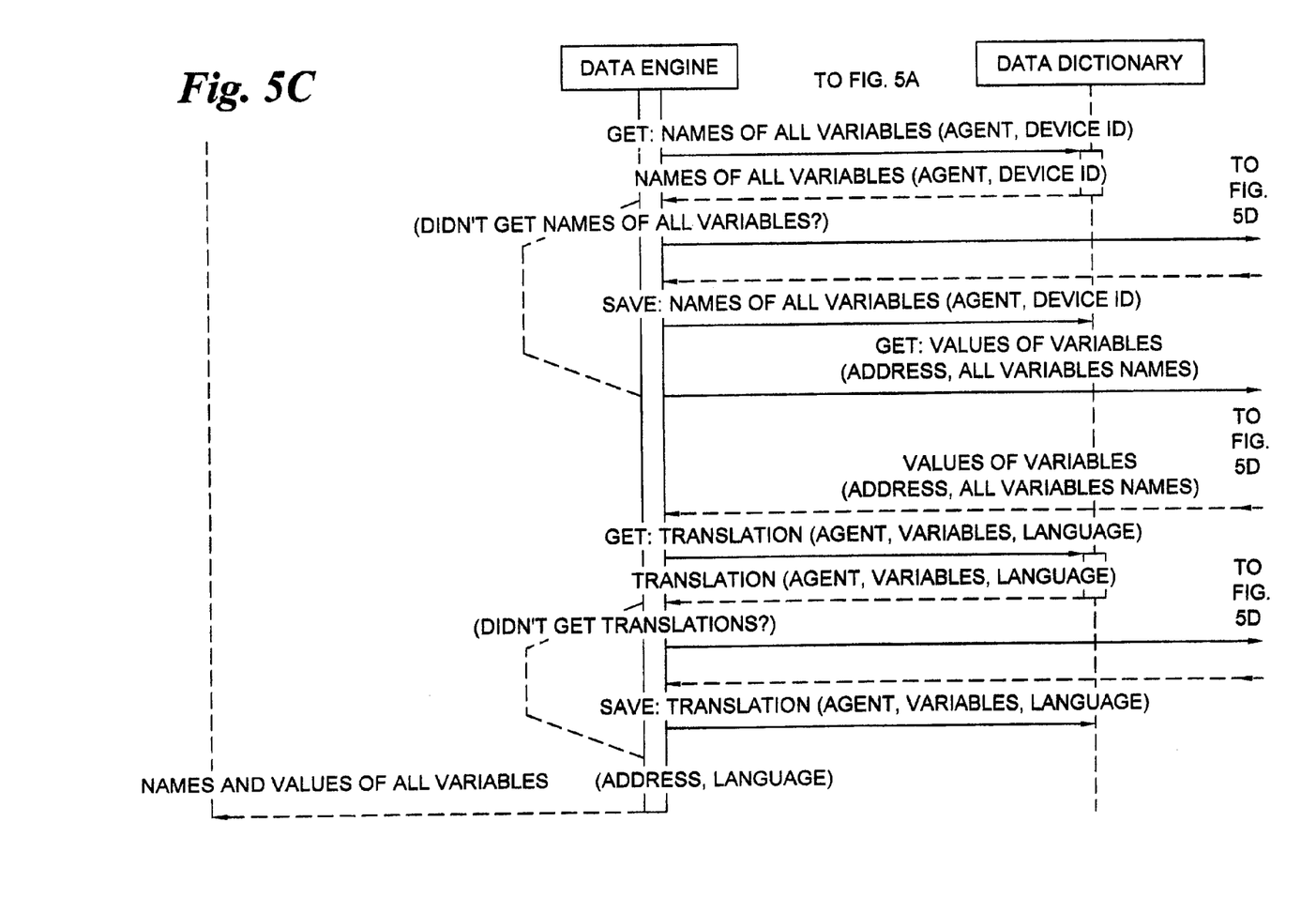
Figure 5D:
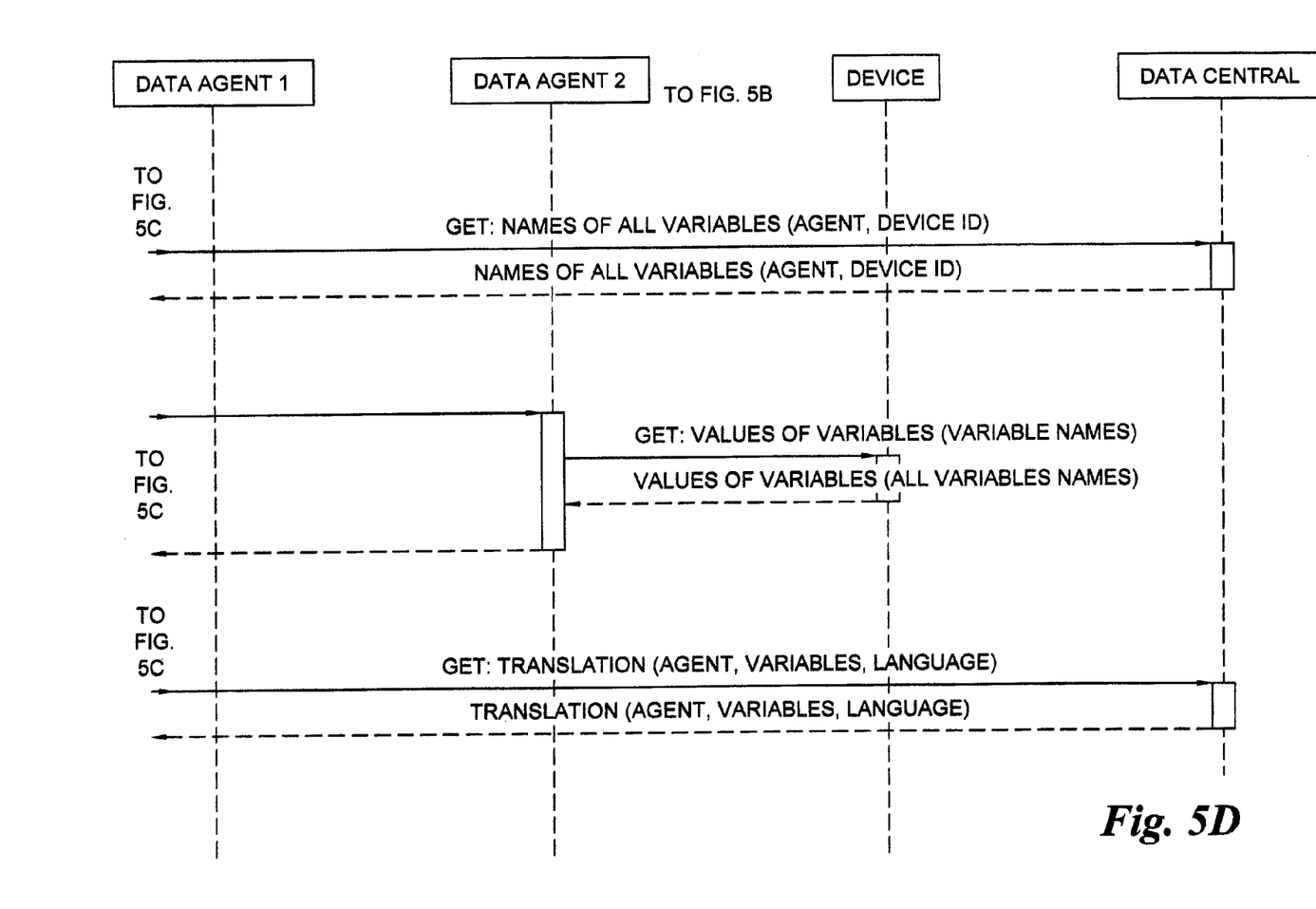
Figure 6A:
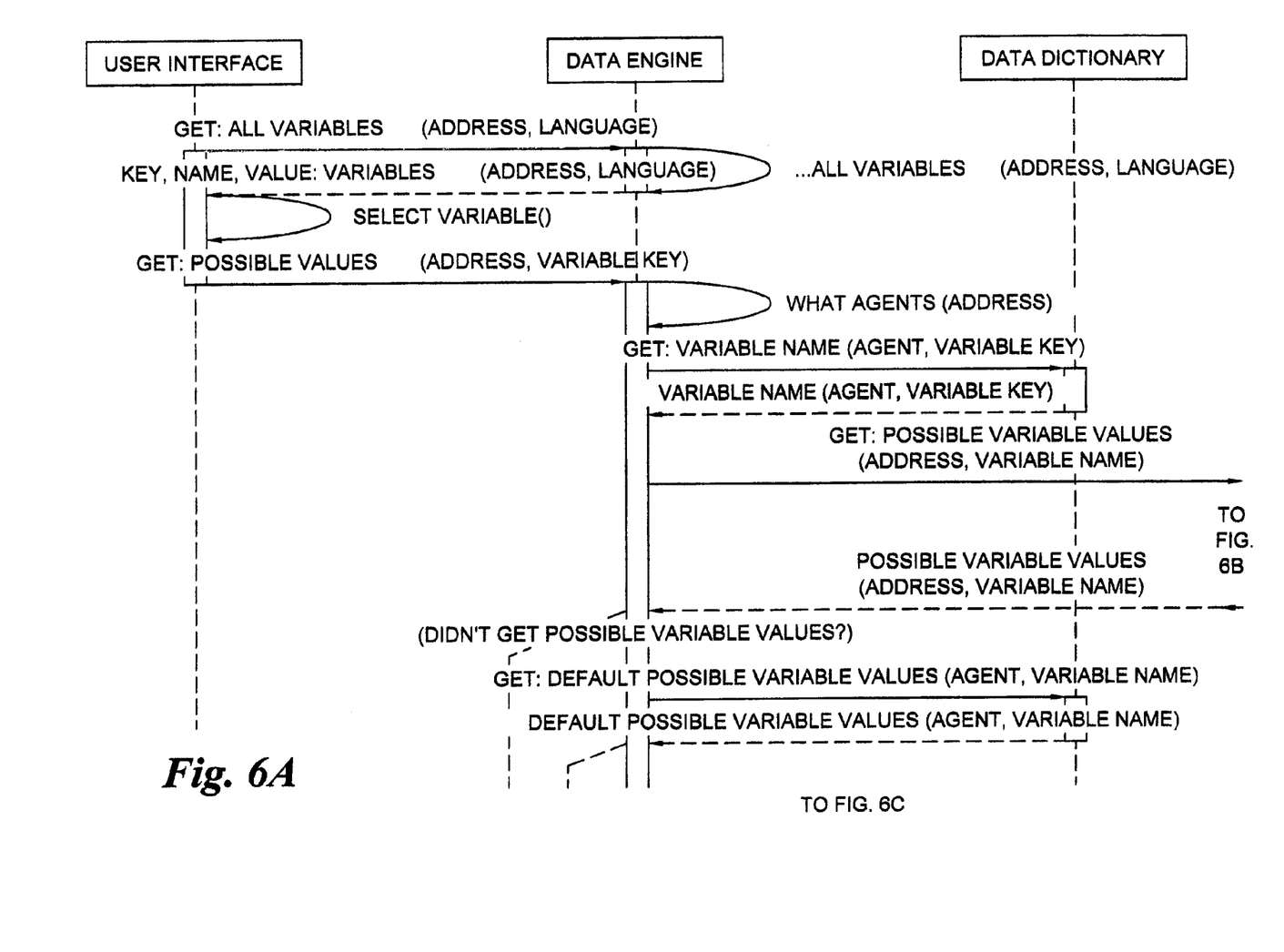
FIGS. 6A–6D is a software sequence diagram corresponding to the flow diagram of FIGS. 4A–14D.
Figure 6B:
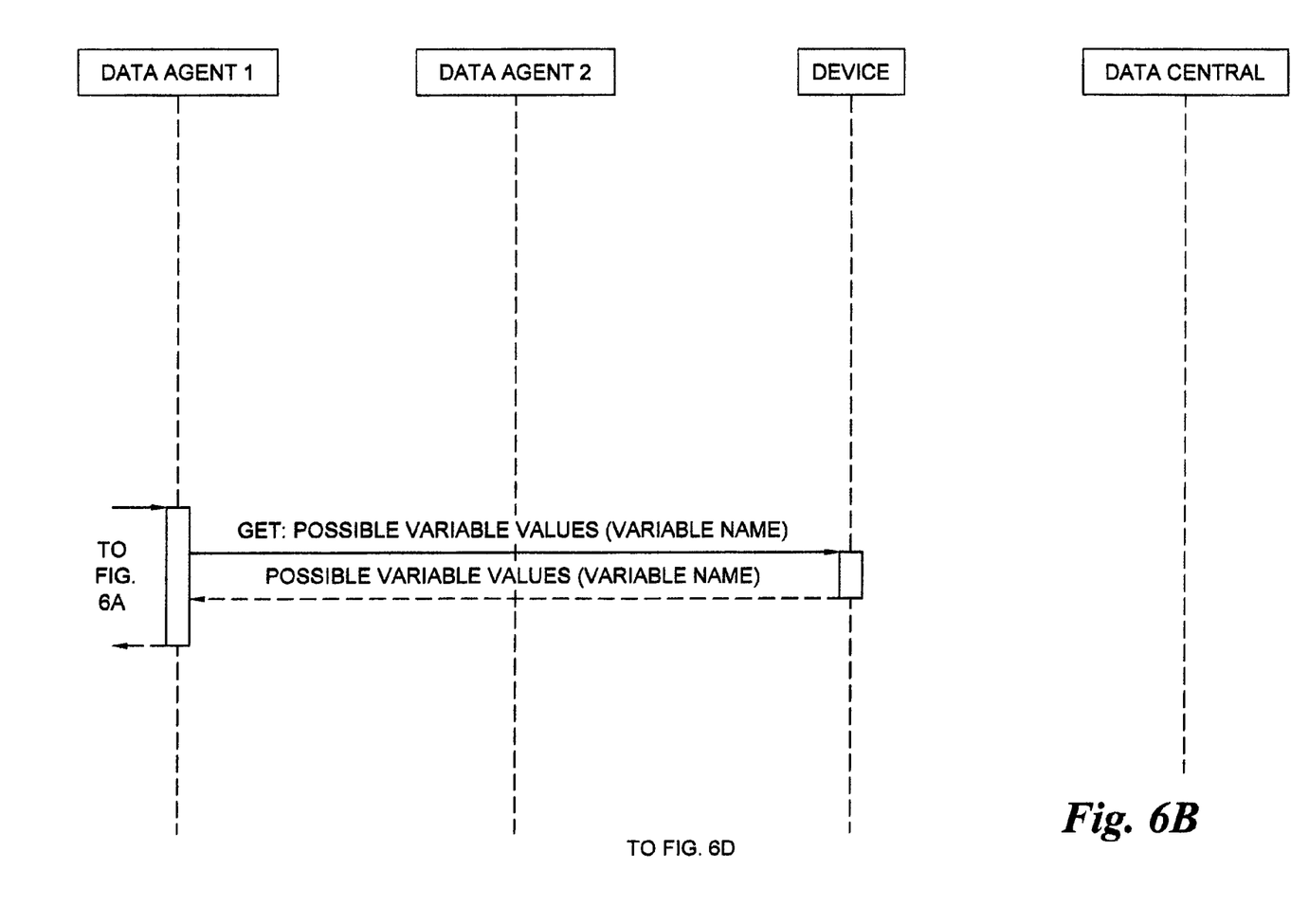
Figure 6C:
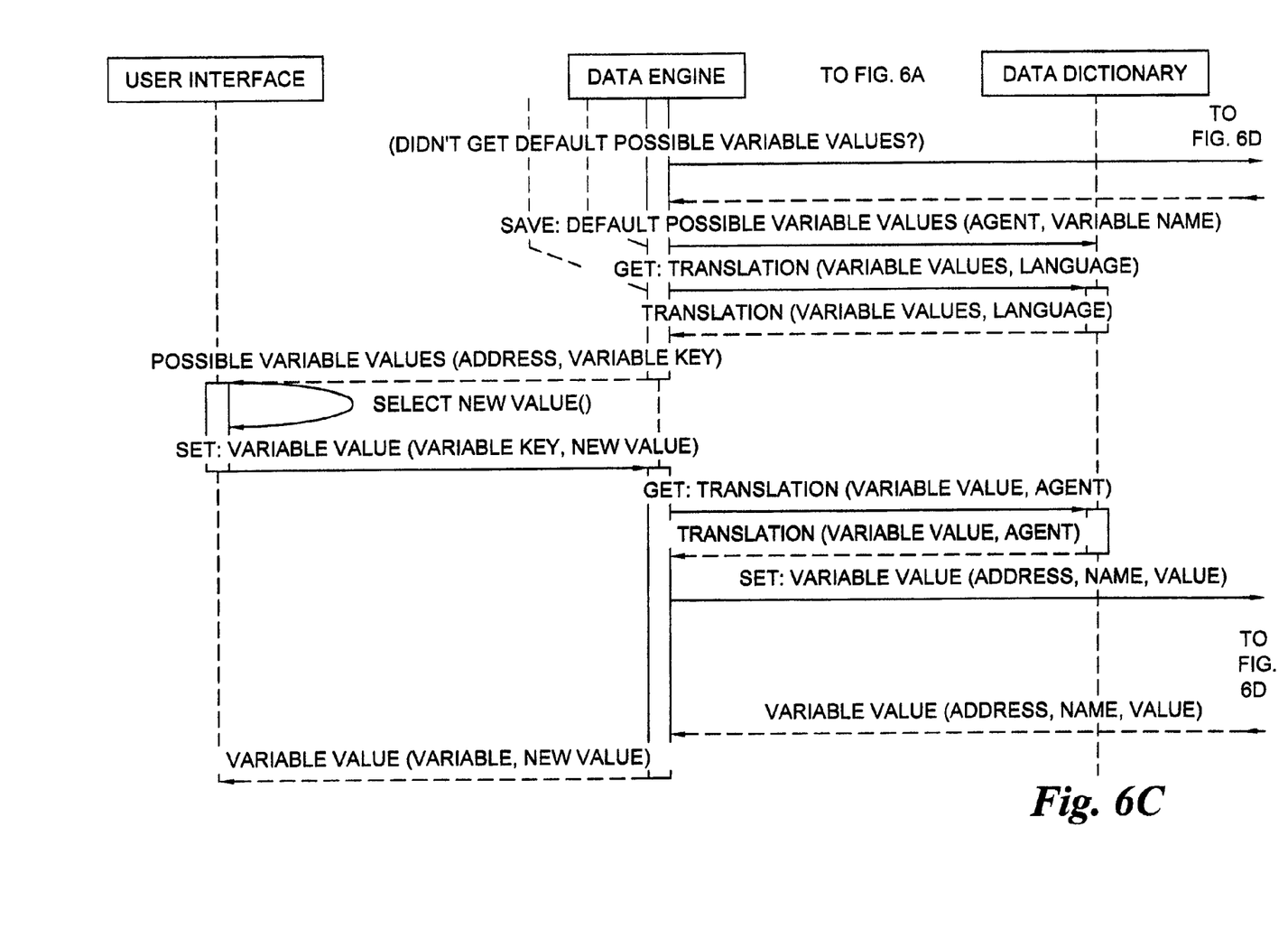
Figure 6D:
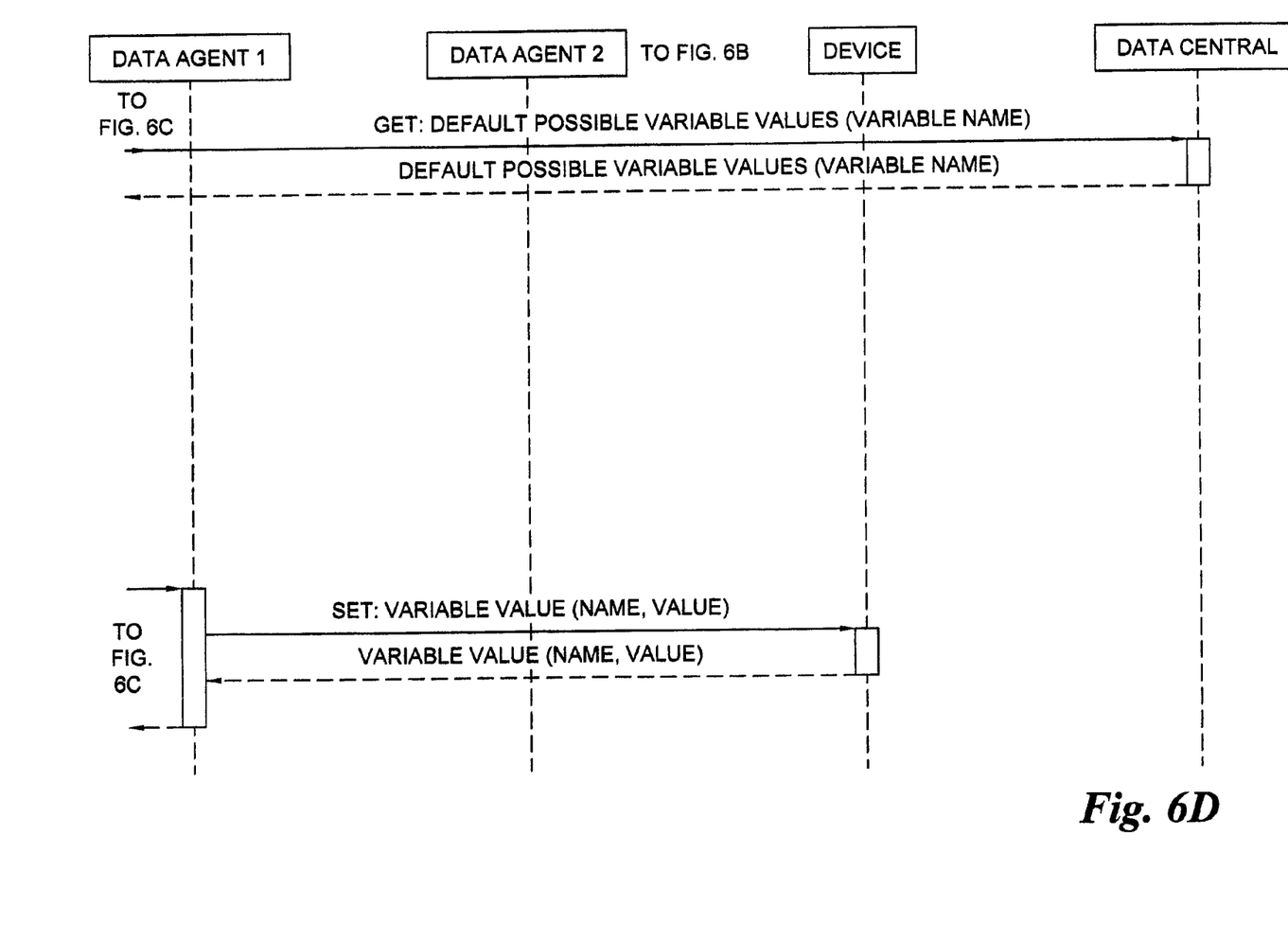

FIG. 2 is a example of formatted data from the data dictionary 24 or data central 26 with variable descriptions in XML based language. The <VARIABLES> may contain multiple <VARIABLE> elements. Each <VARIABLE> element has a "KEY" attribute and multiple child <NAME> elements with translations. FIG. 2also shows an example of formatted data from a data agent 20 formatted in XML. The root XML element is <VARIABLES> which may contain multiple <VARIABLE> elements with "NAME", "VALUE" or "OPTIONS" attributes and with <OPTION> child elements with various possible variable values. Both of the examples of FIG. 2 are provided as samples. Real syntax may vary depending upon the requirements of a particular application.

FIGS. 3A–3B and 4A–4B are standard program flow diagrams using module: function descriptions in the oval boxes with the diamond shaped boxes being branching points. In FIGS. 3A–3B and 4A–4B, the module names are abbreviated as follows:

UI—User Interface Module
DD—Data Dictionary Module
DA—A Data Agent Module
DE—The Data Engine Module
DC—Data Central FIGS. 5A–5D and 6A–6D are sequence diagrams in standard Unified Modeling Language (UML). In FIGS. 5A–5D and 6A–6D, the horizontal boxes across the top and the module names as used above. In FIGS. 5A–5D and 6A–6D time is shown as progressing from the top of the diagrams to the bottom and the arrows represent messages passing among the modules. The vertical boxes or dashed vertical lines represent the time of the module activity.

FIGS. 3A–3B and 5A–5D, taken together are an example of the process of getting translated names and values of all variables. At step 302, the user interface requires values for all variables for each device at a given address using a selective language. At step 304, the data engines selects the particular data agent based upon the address for the device. At step 306, the data dictionary provides the identification names of variables based upon the data agent and address. If the required data is not in the data dictionary, the data central gets the data at block 308 and updates the data dictionary at block 310. At block 312, the data agent provide values from the required address for selected variable names. If the data agent can not provide the required data, the data engine tries another data agent at block 304 and the process repeats. At block 314, the data engine determines the device type from the values of the variables and at block 316, the data dictionary provides names of all of the variables that are relevant for the particular type of device and for the particular data agent. If the data dictionary does not have the list of variables, the names are obtained from the data central at block 318 and, at block 320, the data dictionary is updated. At block 322, the data agent gets the values of the variables for the list of all variables. At block 324, the data dictionary translates the values to the selected language. If insufficient information is available in the data dictionary to perform the translation, the information is obtained from data central at block 326 and at block 328, the data dictionary is updated with the newly obtained data. Finally, at block 330, the user interface module is presented with the translated names and values of all of the variables. The same sequence of steps can be followed by referring to the UML sequence diagram of FIGS. 5A–5D.

FIGS. 4A–4B and 6A–6D illustrate the steps involved in changing a value of a variable. At block 402, the user interface module selects a device address and variable key. At block 404, the data engine selects the agent based upon the selected address. If the agent is available, at block 406, the data dictionary provides the variable name for a given variable key and agent and at block 408 the data agent provides possible values for the variable. If there is no available data agent, at block 410 the data engine tries to determine the device type based upon the address and attempts to get possible values at block 412. If the data dictionary does not contain the possible values they are obtained from the data central at block 414 and the data dictionary is updated at block 416. At block 418, the data dictionary translates the possible variable values to the selected language. If the data dictionary does not have the information necessary for the translation, at block 420 the information is obtained from data central and at block 422, the data dictionary is updated. At block 424, the user interface presents translated possible values of the variables and the user selects the new value. At block 426, the data engine again selects the agent and at block 428, the data dictionary translate the new variable value to the selected data agent language. If the data dictionary does not have sufficient information to complete the translation, at block 430, the translation information is obtained from data central and at block 432, the data dictionary is updated with the new information. At block 434, the data agent changes the variable value. The process describe above and as shown in connection with FIGS. 4A–4B can be followed by reference to the UML sequence diagram of FIGS. 6A–6D.

From the foregoing, it can be seen that the present invention comprises a novel system and method for communicating, monitoring and configuring a device operatively connected to a network. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method using a computer system for automatically presenting values of variables obtained by a data engine from a selected type of device to a user interface in a human-understandable language, the system including a data dictionary containing information for translating the values of the variables in the native language of the device into the human-understandable language, and a data agent which is connected to the device, the method comprising the steps of:

requesting by the data engine from the data dictionary, names of all variables associated with the selected type of device;

obtaining by the data agent from the selected type of device, values of the variables;

obtaining, by the data engine, from the data agent, the values obtained by the data agent;

obtaining from the data dictionary the translating information;

translating, by the data engine, the obtained values of the variables into the human-understandable language using the translating information obtained from the data dictionary; and presenting, by the data engine, to the user interface, the translated values in the human-understandable language.

2. The method as recited in claim 1, further comprising the step of automatically communicating with a data central which is external to the system, for obtaining the names of variables associated with the type of the device and the language of the type of the device when, after communicating with the data dictionary, the names of the variables, and/or the language of the type of the device are not available from the data dictionary, in order to facilitate translation of the values into the human-understandable language.

3. The method as recited in claim 2, further comprising the step of automatically storing, in the data dictionary, the names of the variables associated with the type of the device and the language of the type of the device obtained from the data central.

4. A method, using a computer system, for establishing communication with a device, said device having a known network address but having a language and/or protocol for communication with the device that is unknown to the system, said computer system comprising a data engine and a plurality of data agents, each one of the plurality of data agents being associated with a specific language and protocol, the method comprising the steps of:

(a) selecting one of the plurality of data agents based on the network address;

(b) communicating with a data dictionary to obtain names of variables associated with a union of the selected network address and the selected data agent; and (c) obtaining values of the variables from the device at the selected network address required for determining a type of the device using the language and protocol of the selected data agent, wherein if the required values are obtained, a type of the device is determined from the values of the variables, and if the required values are not obtained, automatically repeating steps (a), (b) and (c) until the required values are obtained.

5. The method of claim 4, wherein if the names of the variables associated with the union of the network address and the selected data agent are not obtained from the data dictionary, communication is automatically established between the data dictionary and a data central for obtaining the names of the variables, the data dictionary being thereafter automatically updated with the names of the variables obtained from the data central.

6. The method of claim 5, wherein the step of establishing communication between the data dictionary and the data central is via a hyper text markup language link.

7. The method of claim 4, further including the step of communicating with the data dictionary to obtain the names of the variables associated with the type of the device.

8. The method of claim 7, further including the step of establishing communication with the device to obtain values of the variables associated with the type of the device.

9. The method of claim 8, further including the step of translating the names and the values of the variables into a language understandable by a human.

10. The method of claim 7, wherein if the names of the variables associated with the type of the device are not obtained from the data dictionary, communication is automatically established between the data dictionary and a data central for obtaining the names of the variables, the data dictionary being thereafter automatically updated with the names of the variables obtained from the data central.

11. The method of claim 10, wherein the step of establishing communication between the data dictionary and the data central is accomplished via a hyper text transfer protocol.

12. The method of claim 4, further including the step of dynamically updating the data dictionary with the type of the device, the protocol and language for establishing communication with the type of the device and the names of the variables associated with the type of the device.

13. A computer system for communicating with a device connected to the system at a network address by the use of a data agent which communicates with the device using the specific protocol and/or language of the device, said system comprising:
- a data engine;
- a plurality of data agents operatively connected to the data engine, at least two of the data agents being adapted to utilize a different language and/or protocol for communicating with the device; and
- a data dictionary connected to the data engine, said data dictionary containing information for translating the values of device variables in the native language of the device into human understandable language and being adapted to automatically provide names of the device variables corresponding to both the network address and to the language and/or protocol of the device, wherein the data engine uses the names of the device variables provided by said data dictionary to automatically obtain values of the device variables from the device, and wherein the data engine automatically translates the values of the device variables into human understandable language using the information obtained from the data dictionary for translating the values.

14. The system of claim 13, further including a data central operatively connected to the data dictionary, wherein if the names of the variables are not obtained from the data dictionary, communication is automatically established between the data dictionary and the data central for obtaining the names of the variables, the data dictionary being thereafter automatically updated with the names of the variables obtained from the data central.

15. The system of claim 14, wherein the step of establishing communication between the data dictionary and the data central is via a hyper text transfer protocol.

16. The system of claim 14, wherein the data dictionary and/or the data central are adapted to provide the names of variables associated with a type of the device.

17. The system of claim 14, wherein the data dictionary and/or the data central are adapted to provide the names of the variables based upon a selected variable key.

* * * * *